United States Patent [19]

Gallucci et al.

[11] Patent Number: 5,061,746

[45] Date of Patent: Oct. 29, 1991

[54] SILANE DERIVATIVES WHICH IMPROVE PROPERTIES OF PPE-POLYAMIDE COMPOSITIONS

[75] Inventor: Robert R. Gallucci, Roger W. Avakian, both of Pittsfield, Mass.

[73] Assignee: General Electric Company, Pittsfield, Mass.

[21] Appl. No.: 455,864

[22] Filed: Dec. 19, 1989

Related U.S. Application Data

[63] Continuation of Ser. No. 140,959, Dec. 31, 1987, abandoned, which is a continuation of Ser. No. 888,624, Jul. 21, 1986, abandoned, which is a continuation of Ser. No. 669,130, Nov. 7, 1984, abandoned.

[51] Int. Cl.$^5$ ............................................... C08K 5/54
[52] U.S. Cl. .................................. 524/188; 524/262; 524/264; 524/265; 524/500; 524/508; 525/132
[58] Field of Search ............... 524/188, 262, 264, 269, 524/265, 606, 508, 500

[56] References Cited

U.S. PATENT DOCUMENTS

| | | | |
|---|---|---|---|
| 3,833,534 | 9/1974 | Tierney | 524/262 |
| 4,315,086 | 2/1982 | Ueno et al. | 525/391 |
| 4,338,421 | 7/1982 | Maruyama | 525/905 |
| 4,399,246 | 8/1983 | Hyde | 524/169 |
| 4,433,088 | 2/1984 | Haaf | 524/153 |

FOREIGN PATENT DOCUMENTS

| | | |
|---|---|---|
| 46040 | 2/1982 | European Pat. Off. . |
| 131445 | 1/1985 | European Pat. Off. . |
| 13944 | 5/1973 | Japan . |
| 66452 | 4/1984 | Japan . |
| 2131037 | 6/1984 | United Kingdom . |

Primary Examiner—Christopher Henderson
Attorney, Agent, or Firm—Hedman, Gibson, Costigan & Hoare

[57] ABSTRACT

Novel polyphenylene ether-polyamide compositions having improved compatibility, elongation and impact properties as well as improved processability are prepared comprising one or more polyphenylene ethers, one or more polyamides and a property improving silane derivative compound having in the molecule both (a) at least one silicon bonded to a carbon through an oxygen link and (b) at least one ethylenic carbon-carbon double bond or carbon-carbon triple bond and/or functional group selected from the group consisting of an amine group or a mercapto group, with the proviso that the functional group is not directly bonded to a silicon atom. These compositions may further comprise a polymeric impact modifier therefore and/or an inorganic reinforcing additive and/or other polymers including alkenyl aromatic polymers.

15 Claims, No Drawings

SILANE DERIVATIVES WHICH IMPROVE PROPERTIES OF PPE-POLYAMIDE COMPOSITIONS

This is a continuation of application Ser. No. 140,959 filed on 12/31/87; abandoned which is a continuation of application Ser. No. 888,624 filed on 07/21/86, abandoned; which is a continuation of application Ser. No. 669,130 filed on 11/07/84, abandoned.

The present invention relates to resin compositions comprising one or more polyphenylene ethers, one or more polyamides and a property improving compound having in the molecule both (a) at least one silicon bonded to carbon through an oxygen link and (b) at least one ethylenic carbon-carbon double bond or carbon-carbon triple bond and/or functional group selected from the group consisting of an amine group or a mercapto group, with the proviso that the functional group is not directly bonded to a silicon atom. The compositions of the present invention are found to have superior impact strength and tensile elongation, as well as better overall properties, as compared to unmodified polyphenylene ether-polyamide compositions.

The polyphenylene ether resins are characterized by a unique combination of chemical, physical and electrical properties over a temperature range of more than 600° F., extending from a brittle point of about $-275°$ F. to a heat distortion temperature of about 375° F. This combination of properties renders the polyphenylene ethers suitable for a broad range of applications. However, in spite of the aforementioned beneficial properties, the usefulness of the polyphenylene ether resins is limited as a consequence of their poor processability, impact resistance and chemical resistance.

Finholt (U.S. Pat. No. 3,379,792) discloses polymer blends wherein the processability of polyphenylene ether resins may be improved by blending therewith from 0.1 to 25% by weight of a polyamide. However, the advantages of the Finholt invention are limited by the fact that when the concentration of the polyamide exceeds 20% by weight, appreciable losses in other physical properties result. Specifically, there is no, or at best poor, compatibility between the polyphenylene ether and the polyamide such that phase separation of the resins occurs on molding or the molded article is inferior in mechanical properties.

Ueno et al (U.S. Pat. No. 4,315,086) discloses polyphenylene ether blends having improved chemical resistance without a loss of other mechanical properties by blending therewith a polyamide and a specific compound selected from the group consisting essentially of A) liquid diene polymers, B) epoxy compounds and C) compounds having in the molecule both of i) an ethylenic carbon-carbon double bond or carbon-carbon triple bond and ii) a carboxylic acid, acid anhydride, acid amide, imide, carboxylic acid ester, amino or hydroxyl group.

Finally, Kasahara et al (EP46040) discloses the use of a copolymer comprising units of a vinyl aromatic compound and either an alpha, beta-unsaturated dicarboxylic acid anhydride or an imide compound thereof as a modifier to an impact resistant polyphenylene ether-polyamide blend for improved heat resistance and oil resistance.

Applicants have now discovered novel polyphenylene ether-polyamide compositions having superior impact strength and tensile elongation as well as excellent general physical properties including strength, chemical resistance, processability and/or heat resistance as compared to unmodified polyphenylene ether-polyamide compositions. Additionally, these compositions have greatly reduced water absorption as compared to polyamide alone. Specifically, applicants have discovered novel resin compositions having the aforementioned properties comprising one or more polyphenylene ethers, one or more polyamides and a property improving compound having in the molecule both (a) at least one silicon atom bonded to a carbon atom through an oxygen link and (b) at least one ethylenic carbon-carbon double bond or carbon-carbon triple bond and/or at least one functional group selected from the group consisting of an amino group or a mercapto group or both, with the proviso that neither the amine group nor the mecapto group is directly bonded to a silicon atom. Optionally, the compositions of the present invention may further comprise a polymeric impact modifier therefore and/or an inorganic reinforcing additive and/or other polymers including alkenyl aromatic polymers such as the styrenic polymers.

The improved polyphenylene ether-polyamide compositions of applicants' invention may be made by melt blending the above-mentioned ingredients. Alternatively, it may be preferred to achieve optimum property improvements to premix the property improving compound, together with either one of the polymer resins, most preferably the polyphenylene ether, and subsequently add the second polymer resin.

Although the exact physical configuration of the compositions of the present invention is not known, it is generally believed that the compositions comprise a dispersion of one polymer in the other. Applicants believe the likely configuration is wherein the polyphenylene ether is dispersed in a polyamide matrix, however, the inverse may also be possible particularly where the polyamide is present in only a minor amount. Applicants also contemplate that there may be present in the products produced hereby some graft polyphenylene ether-polyamide products wherein the silane derivative compound may serve as a graft linking agent. Thus, all such dispersions as well as graft, partially grafted and non-grafted products are within the full intended scope of the present invention.

The polyphenylene ethers suitable for use in the practice of the present invention are well known in the art and may be prepared by any of a number of catalytic and non-catalytic processes from corresponding phenols or reactive derivatives thereof. Examples of polyphenylene ethers and methods for their production are disclosed in U.S. Pat. Nos. 3,306,874; 3,306,875; 3,257,357; 3,257,358; 3,337,501 and 3,787,361, all incorporated herein by reference. For brevity, the term "polyphenylene ether" as used throughout this specification and the appended claims will include not only unsubstituted polyphenylene ether (made from phenol) but also polyphenylene ethers substituted with various substituents. The term also includes polyphenylene ether copolymers, graft copolymers and block copolymers of alkenyl aromatic compounds, especially vinyl aromatic compounds, as disclosed below, and a polyphenylene ether.

Suitable phenol compounds for the preparation of the polyphenylene ethers may be represented by the general formula:

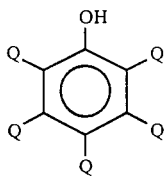

$$I$$

wherein each Q is a monovalent substituent individually selected from the group consisting of hydrogen, halogen, aliphatic and aromatic hydrocarbon and hydrocarbonoxy radicals free of a tertiary alpha-carbon atom and halohydrocarbon and halohydrocarbonoxy radicals free of a tertiary alpha-carbon atom and having at least two carbon atoms between the halogen atom and the phenyl nucleus, and wherein at least one Q is hydrogen.

As specific examples of the phenol compound represented by the above formula, there may be given phenol; o-, m- and p- cresols; 2,6-, 2,5-, 2,4- and 3,5- dimethylphenols; 2-methyl-6-phenyl-phenol; 2,6-diphenylphenol; 2,6-diethylphenol; 2-methyl-6-ethylphenol; and 2,3,5-, 2,3,6- and 2,4,6-trimethylphenols. Two or more phenol compounds may be used in combination should copolymers be desired. Additionally, copolyphenylene ethers may also be prepared from a phenol compound of the above general formula with a phenol compound not represented by the above general formula including, for example, a dihydric phenol such as bisphenol-A, tetrabromobisphenol-A, resorcinol or hydroquinone.

Illustrative of suitable polyphenylene ethers there may be given, for example, poly(2,6 dimethyl-1,4-phenylene)ether; poly(2-methyl-1,4-phenylene)-ether, poly(3-methyl-1,4-phenylene)ether; poly(2,6-diethyl-1,4-phenylene)ether; poly(2-methyl-6-allyl-1,4-phenylene)ether; poly(2,6-dichloromethyl-1,4-phenylene)ether; poly(2,3,6-trimethyl-1,4-phenylene)ether; poly(2,3,5,6-tetramethyl phenylene)ether; poly (2,6-dichloro-1,4-phenylene)ether; poly(2,6-diphenyl-1,4-phenylene)ether; poly(2,5-dimethyl-1,4-phenylene)-ether and the like. Further, as mentioned above, copolymers of the phenol compounds may also be used.

Preferred polyphenylene ethers will have the formula:

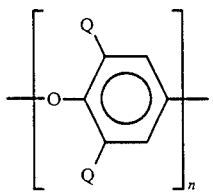

where Q is as defined above and n is at least 50, preferably from about 50 to about 200. Examples of polyphenylene ethers corresponding to the above formula can be found in the above referenced patents and include, among others: poly(2,6-dilauryl-1,4-phenylene)ether; poly(2,6-diphenyl-1,4-phenylene)-ether; poly(2,6-dimethoxy-1,4-phenylene)ether; poly -(2,6-diethoxy-1,4-phenylene)ether; poly (2- methoxy-6-ethoxyphenylene)ether; poly(2-ethyl-6-stearyloxy-1,4-phenylene)ether; poly(2,6-dichloro-1,4-phenylene)ether; poly(2-methyl-6-phenyl-1,4-phenylene)ether poly (2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

For the purpose of the present invention, an especially preferred family of polyphenylene ethers include those having a $C_1$ to $C_4$ alkyl substitution in the two positions ortho to the oxygen ether atom. Illustrative member of this class are: poly(2,6-dimethyl-1,4-phenylene)ether; poly(2,6-diethyl-1,4-phenylene)ether; poly(2-methyl-6-ethyl-1,4-phenylene)ether; poly(2,6-dipropyl-1,4-phenylene)ether; poly (2-ethyl-6-propyl-1,4-phenylene)ether; and the like; most preferably poly(2,6-dimethyl-1,4-phenylene)ether.

One method for the production of the above polyphenylene ethers is by the oxidation of a phenol compound by oxygen or an oxygen-containing gas in the presence of a catalyst for oxidative coupling. There is no particular limitation as to the choice of catalysts and any catalysts for oxidation polymerization can be employed. As typical examples of the catalyst, there may be given a catalyst comprising a cuprous salt and a tertiary amine and/or secondary amine, such as cuprous chloride-trimethylamine and dibutylamine, cuprous acetate-triethylamine or cuprous chloridepyridine; a catalyst comprising a cupric salt, a tertiary amine, and an alkali metal hydroxide, such as cupric chloride-pyridine-potassium hydroxide; a catalyst comprising a manganese salt and a primary amine, such as manganese chloride-ethanolamine or manganese acetate-ethylenediamine; a catalyst comprising a manganese salt and an alcoholate or phenolate, such as manganese chloride-sodium methylate or manganese chloride-sodium phenolate; and a catalyst comprising a cobalt salt and a tertiary amine.

Polyamides suitable for the preparation of the compositions of the present invention may be obtained by polymerizing a monoamino-monocarboxylic acid or a lactam thereof having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and a dicarboxylic acid. The dicarboxylic acid may be used in the form of a functional derivative thereof, for example an ester or acid chloride.

The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned ε-aminocaproic acid, butyrolactam, pivalolactam, caprolactam, capryllactam, enantholactam, undecanolactam, dodecanolactam and 3- and 4- aminobenzoic acids.

Examples of diamines suitable for preparing the polyamides include diamines of the general formula $$H_2N(X)_nNH_2$$

wherein X is a $C_2$-$C_{16}$ branched or non-branched aliphatic and/or cycloaliphatic hydrocarbon radical or a $C_6$-$C_{16}$ aromatic hydrocarbon radical, such as trimethylenediamine, tetramethylenediamine, pentamethylenediamine, octamethylenediamine benzenediamine, 2,2,4- or 2,4,4-trimethyl hexamethylenediamine and especially hexamethylenediamine.

The dicarboxylic acids may be aromatic, for example isophthalic and terephthalic acids. Preferred dicarboxylic acids are of the formula

HOOC—Y—COOH wherein Y represents a divalent aliphatic group containing at least 2 carbon atoms, and examples of such acids are sebacic acid, octadecanedoic acid, suberic acid, glutaric acid, pimelic acid and adipic acid.

Typical examples of the polyamides or nylons, as these are often called, include for example polyamides 6, 4/6, 6/6, 11, 12, 6/3, 6/4, 6/10 and 6/12 as well as polyamides resulting from isophthalic acid or terephthalic acid or mixtures thereof and hexamethylenediamine or trimethyl hexamethylene diamine (for example polyamides 6/I, 6/T and 6/I/T), polyamides resulting from adipic acid and meta xylylenediamines, polyamides resulting from adipic acid, azelaic acid and 2,2-bis-(p-aminocyclohexyl)propane and polyamides resulting from terephthalic acid and 4,4'-diaminodicyclohexylmethane. Preferred polyamides are the polyamides 6, 4/6, 6/I, 6/6, 11 and 12, most preferably polyamide 6, 6/6 and 4/6. When used herein and in the appended claims, the term "polyamide" is to be construed as including polyamide copolymers as well as mixtures of homopolymers and/or copolymers.

The blending ratio of polyphenylene ether to polyamide is 5 to 95% by wt. preferably 30 to 70% by wt. of the former to 95 to 5% by wt., preferably 70 to 30% by wt. of the latter. When the polyamide is less than 5 wt.%, its effect to improve solvent resistance is small, while when it exceeds 95 wt.%, thermal properties and dimensional stability tend to become poor.

The property improving compounds suitable for use in the present invention are silane derivatives characterized as having in their molecule both (a) at least one silicon bonded to carbon through an oxygen link and (b) at least one ethylenic carbon-carbon double bond or a carbon-carbon triple bond and/or a functional group selected from the group consisting of an amino group or a mercapto group or both, with the proviso that neither the mercapto nor the amino group is directly bonded to a silicon atom.

As mentioned, the silane derivative compounds must have as one critical feature at least one silicon bonded to carbon through an oxygen linkage. Most commonly, this feature is brought about by an alkoxy or acetoxy group being directly bonded to the silicon, wherein the alkoxy or acetoxy group will generally have less than about 15 carbon atoms and may also contain hetero atoms in the chain, e.g. oxygen. Additionally, there may be present more than one silicon atom wherein any two or more silicon atoms may be bonded to each other through an oxygen link, e.g. siloxanes; a silicon-silicon bond; or a bifunctional organic group, e.g. methylene or phenylene groups. Again, at least one and preferably all silicons will have at least one silicon bonded to carbon through an oxygen link. Preferred compounds will have one silicon atom with three alkoxy or acetoxy groups bonded thereto. Silicon compounds having more than one silicon atom will preferably have the silicon atoms bonded to each other through an oxygen atom (i.e., siloxane).

The second critical feature of the silane derivative modifier is the presence in the molecule of at least one of the following: an ethylenic carbon-carbon double bond, a carbon-carbon triple bond, an amino group and/or a mercapto group. Whereas the carbon-carbon double bond and carbon-carbon triple bond may be directly bonded to the silicon atom, neither the mercapto group nor the amino group may be directly bonded to the silicon. Rather, the mercapto and amino groups are preferably bonded through a carbon linkage. Additionally, although more than one or a combination of amino and/or mercapto groups may be present in any one organic constituent bonded to the silicon atom, it is preferred that only one of such functional groups are present per organic constituent. Finally, the amino group may be either a primary or secondary amine and is preferably a primary amine.

Exemplary of the modifiers that may be used in the present invention there may be given gamma aminopropyl triethoxy silane, 2-(3-cyclohexenyl)ethyl trimethoxy silane, 1,3-divinyl tetraethoxy silane, vinyl- tris-(2-methoxyethoxy)silane, 5-(bicycloheptenyl)triethoxy silane and gamma mercaptopropyl trimethoxy silane.

The amount of the property improving silane derivate compound to be used in the practice of the present invention is that amount which manifests property improvement as compared to unmodified polyphenylene ether polyamide compositions. Such property improvement is most evident in improved compatibility as well as improved processability, impact strength and/or elongation. In general, the amount of property improving silane derivative will be up to about 4%, preferably from about 0.05 to about 2% by weight based on the total composition. The precise amount of silane derivative to achieve the optimum results is dependent upon such factors as the specific silane derivative chosen, the concentration of each ingredients to the composition and the mixing and/or processing conditions including temperature, shear, etc., which can easily be determined by routine experimentation.

In the practice of the present invention, it may be further desirable to add rubbery high-molecular weight polymers to further improve the physical properties, particularly impact strength, and/or processability of the composition. The rubbery high-molecular weight materials include natural and synthetic polymeric materials showing elasticity at room temperature. More specifically, the rubbery high molecular weight materials include natural rubber, thermoplastic elastomers as well as homopolymers and copolymers, including random, block and graft copolymers, derived from various suitable monomers known to those skilled in the art including butadiene possibly in combination with vinyl aromatic compounds, especially styrene. As specific examples of the rubbery high-molecular weight materials, there may be given, for example, natural rubber, butadiene polymers, styrene copolymers, butadiene/styrene copolymers, isoprene polymers, chlorobutadiene polymers, butadiene/acrylonitrile copolymers, isobutylene polymers, isobutylene/butadiene copolymers, isobutylene/isoprene copolymers, acrylic ester polymers, ethylene propylene copolymers, ethylene/propylene/diene copolymers, thiokol rubber, polysulfide rubber, polyurethane rubber, polyether rubber (e.g. polypropylene oxide) and epichlorohydric rubber.

A preferred class of rubber materials are copolymers, including random, block and graft copolymers of vinyl aromatic compounds and conjugated dienes. Exemplary of these materials there may be given hydrogenated, partially hydrogenated, or non-hydrogenated block copolymers of the A-B-A and A-B type wherein A is polystyrene and B is an elastomeric diene, e.g. polybutadiene, radial teleblock copolymer of styrene and a Y conjugated diene, acrylic resin modified styrene-butadiene resins and the like; and graft copolymers obtained by graft-copolymerization of a monomer or monomer mix containing a styrenic compound as the main component to a rubber-like polymer. The rubber-like polymer used in the graft copolymer are as already described herein including polybutadiene, styrene-butadiene copolymer, acrylonitrile-butadiene copolymer, ethylene-propylene copolymer, polyacrylate and the like. The styrenic compounds includes styrene, methylstyrene, dimethylstyrene, isoproylstyrene, alpha-methylstyrene, ethylvinyltoluene and the like. The monomer which may be used together with the styrenic compound includes, for example, acrylate, methyacrylate, acrylonitrile, methyacrylonitrile, methyacrylic acid, acrylic acid and the like.

Finally, additional thermoplastic elastomers suitable for use as the rubbery material include thermoplastic polyester elastomers, thermoplastic poly- ether-ester elastomers, ethylenic ionomer resins and the like.

The amount of the rubbery polymer used will be up to about 100 parts by weight, preferably from about 5 to about 50 parts by weight based on 100 parts by weight of a mixture of polyphenylene ether and polyamide. However, when the amount is less than 2 parts by weight, the effect of the rubbery polymer to improve impact resistance is poor. When the amount is more than 100 parts by weight, the impact resistance is much improved, however, some loss of other physical properties may result. Thus in the interest of balancing impact resistance and other physical properties, it is preferred to use less than 100 parts by weight of the rubbery polymer.

The compositions of the present invention may also comprise similar amounts, as referred to above, of alkenyl aromatic compounds. These alkenyl aromatic compounds may or may not be partially or wholly copolymerized with and/or grafted to the polyphenylene ether. Especially, suitable are the styrene resins described in for example U.S. Pat. No. 3,383,435, incorporated herein by reference. In general, the styrene resins will have at least 25% by weight of the polymer units derived from a vinyl aromatic compound of the formula:

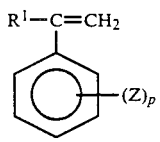

wherein $R^1$ is hydrogen, (lower) alkyl or halogen, Z is vinyl, halogen or (lower) alkyl, and p is 0 or an integer of from 1 to the number of replaceable hydrogen atoms on the benzene nucleus. Herein, the term "(lower) alkyl" is intended to mean alkyl of from 1 to 6 carbon atoms.

The term "styrene resins" as used broadly throughout this disclosure and the appended claims includes, by way of example, homopolymers such as polystyrene and polychlorostyrene, as well as polystyrenes, including high impact polystyrenes, which have been modified by a natural or synthetic rubber, e.g. polybutadiene, polyisoprene, butyl rubber, ethylene-propylene diene copolymers (EPDM rubber), ethylene-propylene copolymers, natural rubbers, polysulfide rubbers, polyurethane rubbers, styrene-butadiene rubbers (SBR), and the like; styrene containing copolymers such as styrene-acrylonitrile copolymers (SAN), styrene-butadiene copolymers, styrene-acrylonitrile-butadiene terpolymers (ABS), poly-alpha-methylstyrene, copolymers of ethyl-vinyl benzene and divinylbenzene and the like.

Finally, in addition to the foregoing, the resin compositions of the present invention may further comprise other reinforcing additives, including glass fibers, carbon fibers, mineral fillers and the like as well as various flame retardants, colorants, stabilizer and the like known to those skilled in the art.

The method for producing the resin compositions of the present invention is not particularly limited, and the conventional methods are satisfactorily employed. Generally, however, melt blending methods are desirable. The time and temperature required for melt-blending are not particularly limited, and they can properly be determined according to the composition of the material. The temperature varies somewhat with the blending ratio of the polyphenylene ether to polyamide, but it is generally within a range of 200° to 350° C. A prolonged time and/or a high shear rate is desirable for mixing, but the deterioration of the resin composition advances. Consequently, the time needs to be determined taking into account these points.

Any of the melt-blending methods may be used, if it can handle a molten viscous mass. The method may be applied in either a batchwise form or a continuous form. Specifically, extruders, Bambury mixers, rollers, kneaders and the like may be exemplified.

All ingredients may directly be added to the processing system or one polymer, preferably the polyphenylene ether may be preblended with the property improving silane derivative prior to blending with the polyamide. With respect to the other ingredients of the composition, all ingredients may be added directly to the processing system or certain additives may be precompounded with each other or either polymer prior to blending with the other polymer. For example, the polyphenylene ether may be precompounded with the rubber polymer and/or the property improving silane derivative and subsequently compounded with the polyamide. In the foregoing discussion, all preblending may be either dry blending or melt blending and is preferably melt blending.

The following examples are presented in order that those skilled in the art may better understand how to practice the present invention. These examples are merely presented by way of illustration and are not to be construed as limiting the invention thereto.

In the following examples the following abbreviations are used to identify the respective silane compound:

GAP gamma aminopropyl triethoxy silane
CET 2-(3-cyclohexenyl)ethyl trimethoxy silane
DVT 1,3-divinyl tetraethoxy silane
VTS vinyl-tris-(2-methoxy ethoxy) silane
BCT 5-(bicycloheptenyl)triethoxy silane
GMP gamma mercaptopropyl trimethoxy silane
Examples E1 –E4, Comparative Examples CE1

A series of polyphenylene ether-polyamide compositions within and outside of the scope of the present invention were prepared. All compositions were prepared on a single screw extruder by direct addition of ingredients and extruded at 300° C. The material was extruded, pelletized and injection molded to make test parts. The specific formulation (parts by weight) and the physical properties thereof are shown in Table I.

This first set of examples clearly demonstrate the improvement in impact strength in the polyphenylene ether - polyamide blends by incorporating therein a silane derivative within the scope of the present invention.

TABLE I

|  | CE1 | E1 | E2 | E3 | E4 |
|---|---|---|---|---|---|
| Polyphenylene ether[a] | 70 | 70 | 70 | 70 | 70 |
| Polyamide 6,6[b] | 30 | 30 | 30 | 30 | 30 |
| GAP | — | 0.5 | — | — | — |
| DVT | — | — | 0.5 | — | — |
| VTS | — | — | — | 0.5 | — |
| GMP | — | — | — | — | 1.5 |
| Unnotched Izod ft.lb./in. | 2.8 | 8.0 | 4.7 | 7.3 | 20.0 |

[a]Poly(2,6-dimethyl-1,4-phenylene)ether produced by General Electric Company
[b]Polyamide 6,6 from duPont Examples E5–E8, Comparative Example CE2

A second series of examples were prepared as described above again demonstrating the effectiveness of various silane derivatives in enhancing impact strength and tensile elongation of polyphenylene ether-polyamide compositions modified with a high molecular weight rubbery polymer. The formulations (in parts by weight) and properties of each were as set forth in Table II.

A review of Examples E5–E8 clearly demonstrates the improvement in impact strength and tensile elongation as a result of the presence of the silane derivative as compared to the comparative Example CE2.

TABLE II

|  | CE2 | E5 | E6 | E7 | E8 |
|---|---|---|---|---|---|
| Polyphenylene ether[a] | 49 | 49 | 49 | 49 | 49 |
| Polyamide 6,6[b] | 41 | 41 | 41 | 41 | 41 |
| Kraton G[c] | 10 | 10 | 10 | 10 | 10 |
| CET | — | 1.6 | — | — | — |
| DVT | — | — | 2.1 | — | — |
| VTS | — | — | — | 0.5 | — |
| BCT | — | — | — | — | 1.2 |
| Notched Izod ft.lb./in. | 0.4–0.9 | 1.9 | 2.0 | 1.5 | 2.5 |
| Tensile Elongation % | 3–8 | 23 | 33 | 17 | 36 |

[a,b]See Table I
[c]styrene-hydrogenated-butadiene-styrene triblock copolymer from Shell.

Examples E9–E11

A third series of examples was prepared demonstrating the utility of various levels of the silane derivative, gamma aminopropyl triethyoxy silane (GAP) in a rubber modified polyphenylene ether-polyamide blend. These examples were prepared as above. The formulations of the examples (in parts by weight) and the physical properties thereof were as shown in Table III.

These examples clearly demonstrate the utility of the silane derivatives at various levels of incorporation.

TABLE III

|  | CE2 | E9 | E10 | E11 |
|---|---|---|---|---|
| Polyphenylene ether[a] | 49 | 49 | 49 | 49 |
| Polyamide 6,6[b] | 41 | 41 | 41 | 41 |
| Kraton G[c] | 10 | 10 | 10 | 10 |
| GAP | — | 1.0 | 1.5 | 2.0 |
| Notched Izod ft.lb./in. | 0.4–0.9 | 1.9 | 1.6–3.3 | 25 |
| Tensile Elongation % | 3–8 | 34 | 20–33 | 25 |

[a,b,c]See Table II above.

Examples E12–E15, Comparative Examples CE3–CE6

A final series of examples was prepared demonstrating the applicability of the present invention to rubber modified polyphenylene ether-polyamide blends employing various polyamides and blends thereof. These examples were prepared as above. The formulations of these examples (in parts by weight) and the physical properties thereof were as shown in Table IV.

Once again, comparison of these examples with their respective non-silane modified compositions clearly demonstrate the improved impact strength and tensile elongation of the compositions of the present invention.

TABLE IV

|  | E12 | CE3 | E13 | CE4 | E14 | CE5 | E15 | CE6 |
|---|---|---|---|---|---|---|---|---|
| Polyphenylene oxide[a] | 49 | 49 | 49 | 49 | 49 | 49 | 22.5 | 22.5 |
| Polyamide 6[b] | 41 | 41 | 20.5 | 20.5 | — | — | — | — |
| Polyamide 6,6[c] | — | — | 20.5 | 20.5 | — | — | 67.5 | 67.5 |
| Polyamide 4,6[d] | — | — | — | — | 41 | 41 | — | — |
| Kraton G[e] | 10 | 10 | 10 | 10 | 10 | 10 | 10 | 10 |
| GAP | 1.5 | — | 1.5 | — | 1.5 | — | 1.5 | — |
| Notched Izod ft.lb./in. | 2.2 | 0.4 | 1.0 | 0.2 | 1.2 | 0.3 | 1.1 | 0.8 |
| Tensile Elongation, % | 52 | 4 | 31 | 2 | 13 | 2 | 31 | 22 |

[a]See a in Table I above
[b]Nylons 6 from Nylon Corporation of America
[c]Nylons 6,6 from duPont
[d]Nylons 4,6 from Dutch State Mines
[e]See note c. Table II Obviously, other modifications and variations of the present invention are possible in light of the above teachings. It is, therefore, to be understood that changes may be made in the particular embodiments of the invention described herein which are within the full intended scope of the invention as defined by the appended claims.

We claim:

1. A resin composition consisting essentially of one or more polyphenylene ethers, one or more polyamides and an effective amount of a silane derivative compound for improving the tensile elongation of the composition, said silane derivative compound having in the molecule both (a) at least one silicon bonded to carbon through an oxygen link and (b) at least one ethylenic carbon-carbon double bond or carbon-carbon triple bond and/or functional group selected from the group consisting of an amine group or a mercapto group with the proviso that the functional group is not directly bonded to a silicon atom, said polyphenylene ether being present in said composition in a weight ratio to said polyamide of from between 95/5 and 49/41.

2. A resin composition consisting of one or more polyphenylene ethers, one or more polyamides and an effective amount of a silane derivative compound for improving the compatibility of said polyamide with said polyphenylene ether, said silane derivative compound having in the molecule both (a) at least one silicon bonded to carbon through an oxygen link and (b) at least one ethylenic carbon-carbon double bond or carbon-carbon triple bond and/or functional group selected from the group consisting of an amine group or a mercapto group with the proviso that the functional group is not directly bonded to a silicon atom.

3. A resin composition comprising:
   (a) at least one poly(2,6-dimethyl-1,4-phenylene)-ether;
   (b) at least one polyamide 6,6; and
   (c) at least one silane compound selected from the group consisting of gamma aminopropyl triethoxy silane, 1,3-divinyl tetraethoxy silane, vinyl-tris-(2-methoxy ethoxy) silane and gamma mercaptopropyl trimethoxy silane, said poly (2,6-dimethyl-1,4-phenylene)ether being present in said composition in a weight ratio to said polyamide 6,6 of from between 95/5 and 70/30, said silane compound being present in said composition at a level of from 0.05 percent to 4 percent by weight based on the total weight of the composition.

4. The composition of claim 1 wherein said polyphenylene ether is present in said composition at a weight ratio to said polyamide of from between 95/5 and 70/30.

5. The resin composition of claim 2 wherein the silane derivative is selected from the group consisting of gamma aminopropyl triethoxy silane; 2-(3-cyclohexenyl)ethyl trimethoxy silane; 1,3-divinyl tetraethoxy silane; vinyl-tris -(2-methoxyethoxy)silane; 5-(bicycloheptenyl)triethoxy silane and gamma mercaptopropyl trimethoxy silane.

6. The resin composition of claim 2 wherein the amount of the silane derivative compound is an amount up to about 4% by weight based on the weight of the total composition.

7. The resin composition of claim 6 wherein the amount of the silane derivative compound is an amount of from about 0.05 to about 2% by weight based on the weight of the total composition.

8. The composition of claim 2 wherein the polyphenylene ether is a homopolymer or a copolymer having units with the repeating structural formula:

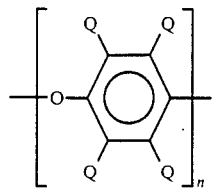

wherein the oxygen ether atom of one unit is connected to the benzene nucleus of the next joining unit, and n is a politive integer and is at least 50, and each Q is independently a monovalent substituent selected from a group consisting of hydrogen, halogen, hydrocarbon and hydrocarbonoxy groups free of a tertiary alpha-carbon atom and halohydrocarbon and halohydrocarbonoxy groups free of a tertiary alpha-carbon atom and having at least 2 carbon atoms between the halogen atom and the phenyl nucleus.

9. The composition of claim 2 wherein the polyamide is selected from the group consisting of polyamide 6; polyamide 6,6; polyamide 12; polyamide 6/10; polyamide 4/6; polyamide 6/I and mixtures thereof.

10. The composition of claim 9 wherein the polyamide is polyamide 6.

11. The composition of claim 9 wherein the polyamide is polyamide 6/6.

12. The composition of claim 9 wherein the polyamide is polyamide 4/6.

13. The composition of claim 2 which further comprises not more than about 50% by weight based on the total composition of a alkenyl aromatic polymer.

14. A resin composition as defined in claim 1 wherein said polyphenylene ether is present in said composition at a weight ratio to said polyamide of from between 95/5 and 70/30.

15. A resin composition as defined in claim 1 consisting essentially of:
   (a) at least one poly(2,6-dimethyl-1,4-polyphenylene)ether;
   (b) at least one polyamide 6,6; and
   (c) at least one silane compound selected from the group consisting of gamma aminopropyl triethoxy silane, 1,3-divinyl tetraethoxy silane, vinyl-tris-(2-methoxy ethoxy) silane and gamma mercaptopropyl trimethoxy silane, said poly(2,6-dimethyl-1,4-phenylene)ether being present in said composition in a weight ratio to said polyamide 6,6 of from between 95/5 and 70/30, said silane compound being present in said composition at a level of from 0.05 percent to 4 percent by weight based on the total weight of the composition.

* * * * *